B. SETTERGREN.
DIFFERENTIAL ANTISKIDDING DRIVING MECHANISM.
APPLICATION FILED JAN. 27, 1913.
1,141,839.
Patented June 1, 1915.
3 SHEETS—SHEET 1.
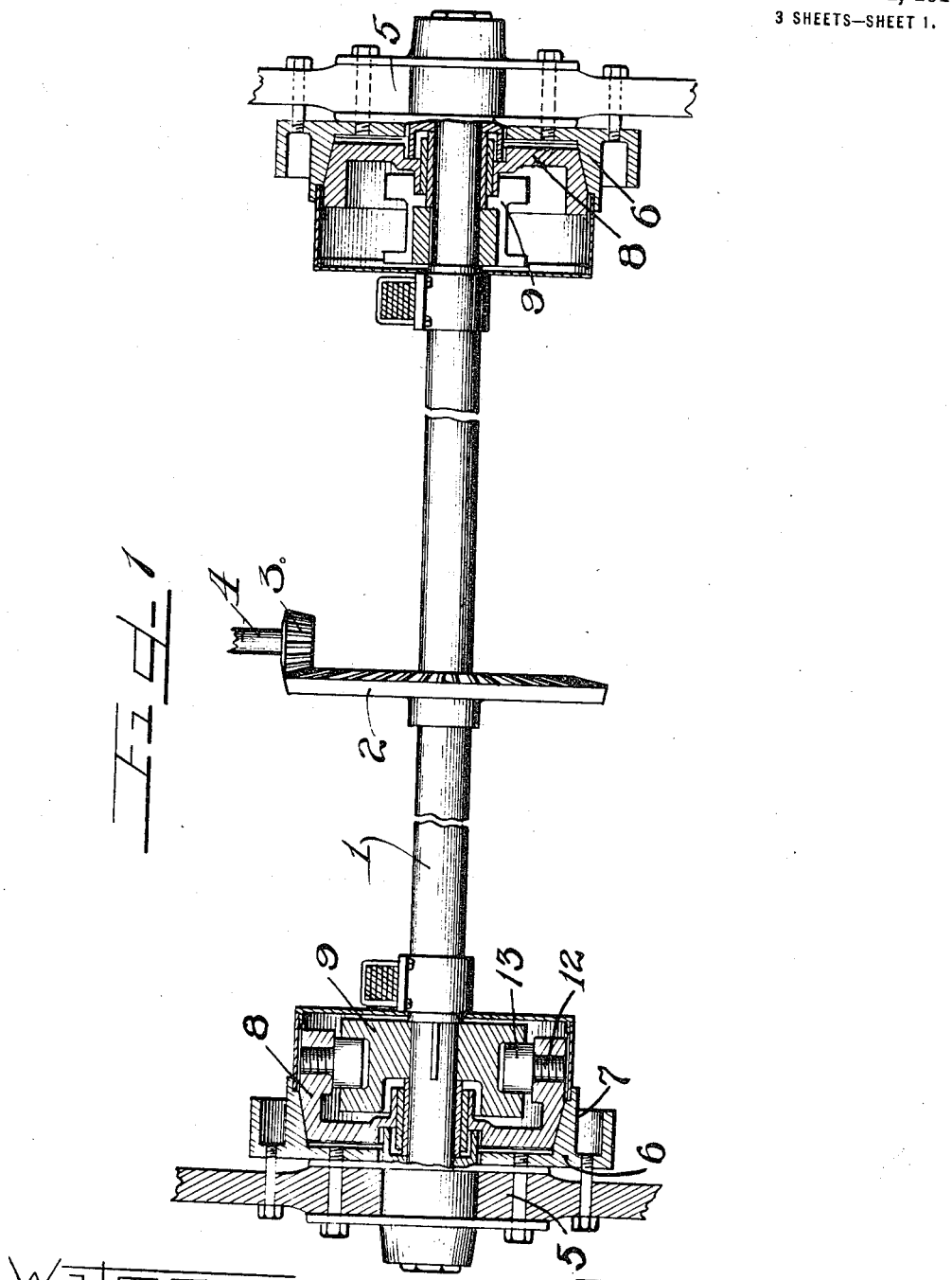

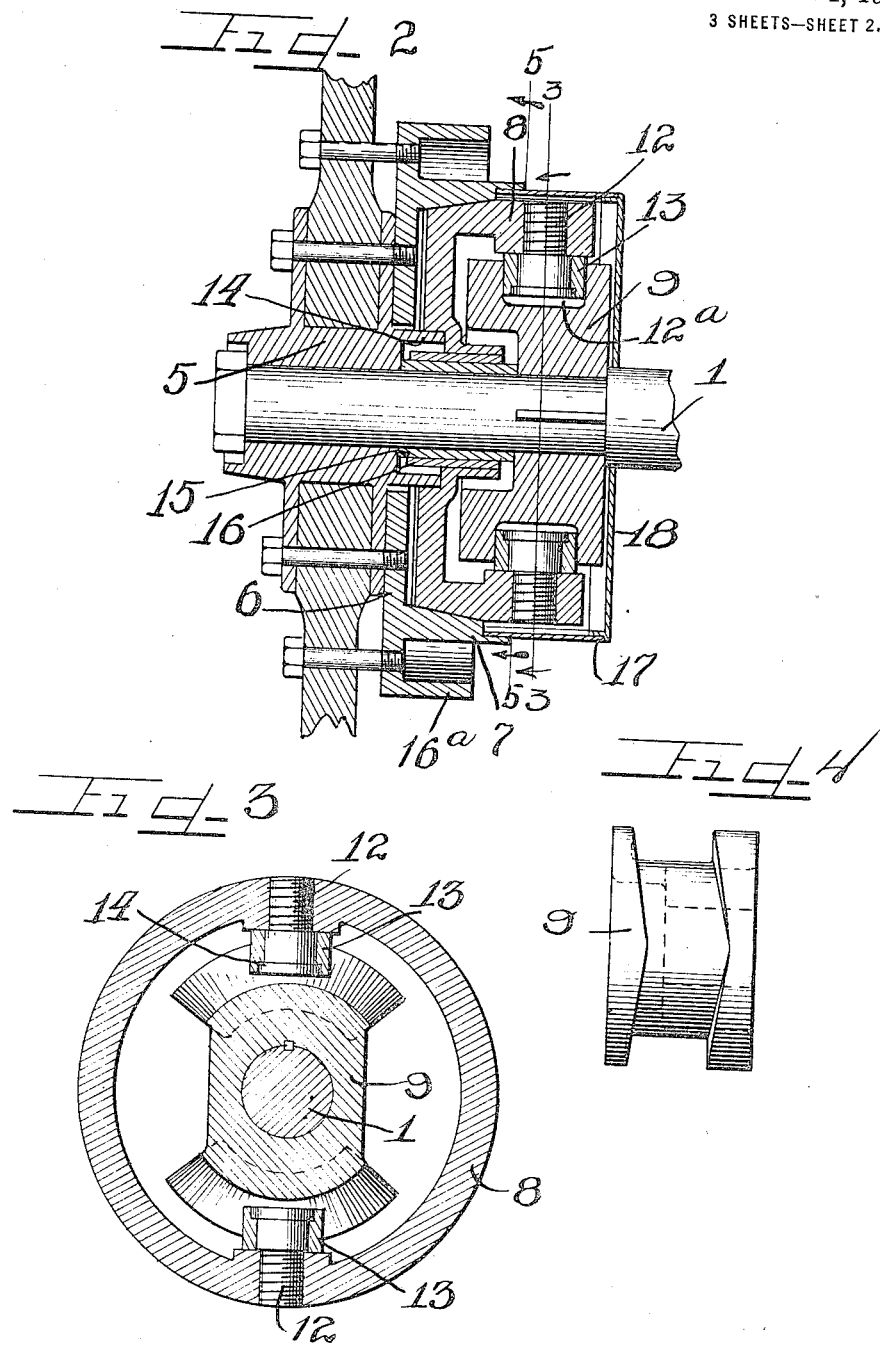

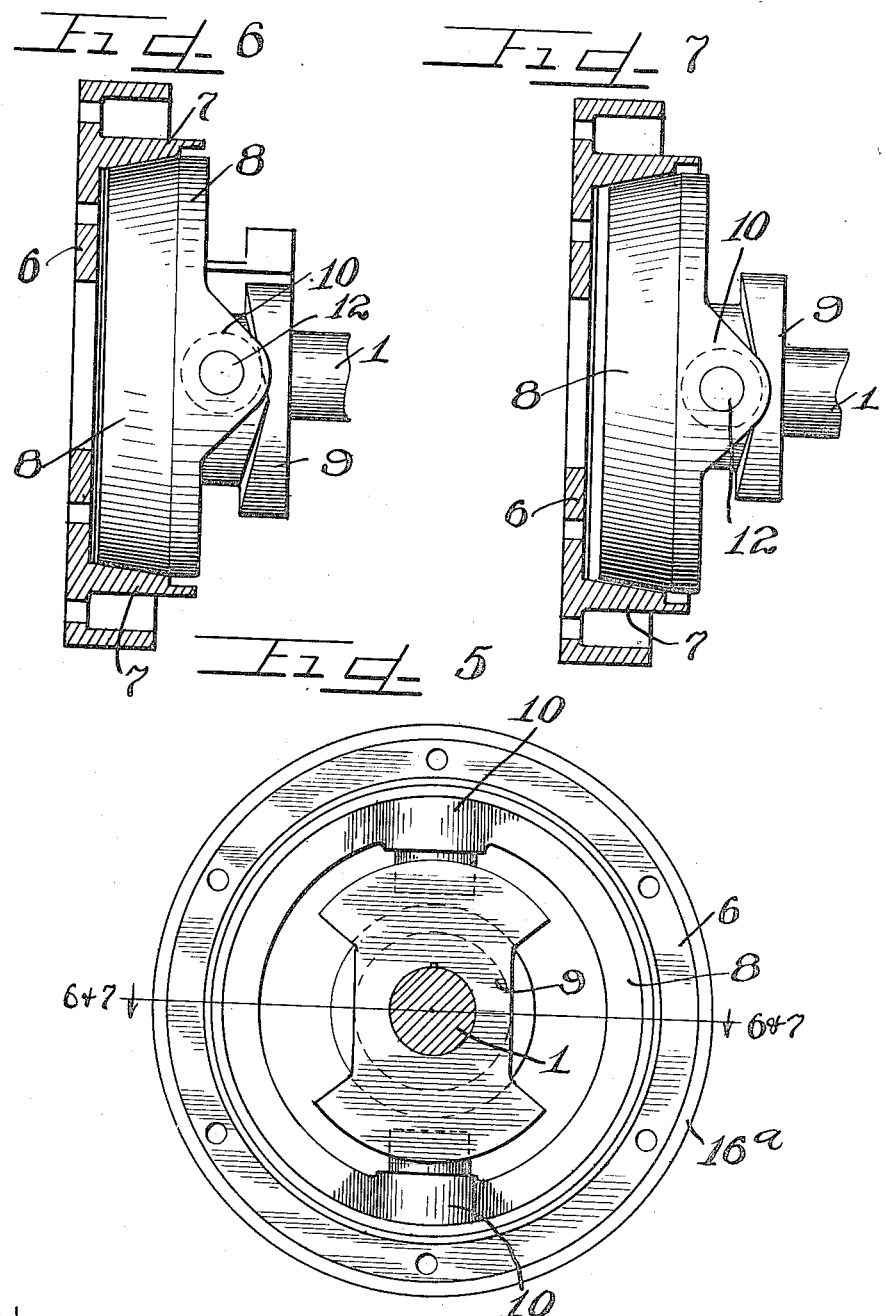

UNITED STATES PATENT OFFICE.

BERNHARD SETTERGREN, OF CHICAGO, ILLINOIS, ASSIGNOR TO MONTE C. MERKER, OF NEW YORK, N. Y.

DIFFERENTIAL ANTISKIDDING DRIVING MECHANISM.

1,141,839.  Specification of Letters Patent.  Patented June 1, 1915.

Application filed January 27, 1913. Serial No. 744,360.

*To all whom it may concern:*

Be it known that I, BERNHARD SETTERGREN, a citizen of the United States, and a resident of the city of Chicago, in the county of Cook and State of Illinois, have invented certain new and useful Improvements in Differential Antiskidding Driving Mechanisms; and I do hereby declare that the following is a full, clear, and exact description of the same, reference being had to the accompanying drawings, and to the numbers of reference marked thereon, which form a part of this specification.

This invention relates to improvements in anti-skidding driving mechanisms of the class set forth in my prior application for patent filed on the 6th day of May, 1909, Serial No. 494,434, for "Automatic clutch gears."

The invention is shown embodied in connection with the rear axle of an automobile or other self-propelled vehicle.

The object of the invention is to drive the wheels of the vehicle differentially without the use of a differential mechanism *per se* connected in the axle, and to assure at all times a positive and effective drive of the vehicle in either direction.

It is also an object of the invention to afford an exceedingly cheap, simple and positively acting mechanism of the class described, positively secured upon the axle and releasably engaging the driving wheels to propel the vehicle under all possible conditions of drive.

It is also an object of the invention to afford a mechanism whereby "skidding" is impossible.

It is a further object of the invention to afford an exceedingly strong, simple and durable mechanism of the class described, adapted to operate positively under all conditions and so constructed as to be practically self-adjusting under all conditions.

The invention embraces the matters hereinafter described and more fully pointed out and defined in the appended claims.

In the drawings: Figure 1 is a fragmentary view, showing the axle in elevation and the differential clutches in section. Fig. 2 is an enlarged section taken through one of the wheels and the clutch showing the shaft or axle in elevation. Fig. 3 is a section taken on line 3—3 of Fig. 2. Fig. 4 is a detail elevation of the fixed cam. Fig. 5 is a section taken on line 5—5 of Fig. 2, and with the dust casing removed. Fig. 6 is a section on line 6—6 of Fig. 5, showing the male member of the clutch in elevation and the parts engaged in driving position. Fig. 7 is a similar section, showing the parts disengaged or in neutral position.

As shown in the drawings: 1, indicates the axle, and 2, a bevel gear secured thereon to drive the same, meshing with which is a pinion 3, driven by a shaft 4, from the engine. A sprocket wheel or wheels may be secured on the shaft in lieu of the gear drive, where the chain drive is preferred.

Rotatably secured upon the ends of the shaft in any suitable manner, either with ball, roller or plain bearings, are the vehicle wheels 5, bolted or otherwise rigidly secured on the inner side of which is a clutch member 6. The clutch shown is a simple cone clutch, although the mechanism embodying my invention may apply to a multiple disk and other forms of clutch as well as to a cone clutch. As shown, however, the web of said clutch member (which is rigidly bolted to the wheel concentric with the axle) is provided with an inwardly projecting flange 7, also concentric with the axle, and flaring outwardly to afford a conical seat complemental with the taper of a conical male clutch member 8, actuated from the axle.

Rigidly keyed on the axle, or otherwise secured thereto, is a collar 9, provided on diametrically opposite sides with a cam groove inclining from each end outwardly from the wheel, as shown in Figs. 6 and 7. Said cam ring or collar 9, is cut away or reduced in width or diameter between the ends of the cam grooves, as shown in Fig. 3, so that the width or diameter of the collar taken at a right angle with the cam groove, is preferably materially reduced. Said male clutch member 8, is cored on its outer side to receive said cam ring or collar therein, as shown in Fig. 2, and is provided on opposite sides with outwardly extending lugs 10, each having a threaded aperture therein and in each of which is threaded a stud screw or bolt 12, the end or head of which projecting in the respective cam grooves in the cam ring, is cylindric to receive thereon a roller 13, which tracks within the cam groove. As shown also, the head of each of said stud screws is provided with a flange 12ª, as is usual in such constructions to retain the roller in place. Conveniently, the tapered or male member 8, of the clutch is recessed in its inner face concentric with its center to fit over the inwardly directed hub flange 14, of the wheel and is centralized on the shaft thereby and also by any suitable filler rings or bushings 15 and 16, of any suitable bearing material secured on the shaft and fitting in the bore of said clutch member.

Integrally secured at the periphery of the web of the female member 6, of the clutch and concentric with the flange 7, is an outer brake flange 16ª, to which may be applied an external brake band or, if preferred, an expansion brake may be provided in the recess afforded between the flange 16, and flange 7.

As shown, a sheet metal or other suitable shell or band 17, incloses the male member of the clutch and seats at its inner edge in a suitable recess in the flange 7, as shown in Figs. 1 and 2. Fitted in the end of said shell or band is a web 18, concentric with the shaft, which wholly closes said shell. Said shell and web 18, together with the female member of the clutch wholly incloses the mechanism and excludes all dirt and dust therefrom and assists in retaining any lubricant applied.

The operation is as follows: In driving from a state of rest, the first impulse applied to the axle rotates the cam rings therewith, inasmuch as they are rigidly secured to the axle, thereby forcing the male clutch member 8, inwardly into positive and binding engagement with the female clutch member, thus positively engaging the driving wheels with the axle through the medium of the bolts and friction rollers projecting from the male clutch member 8, into the cam grooves. While so driving, as, for example, upon a straight road, the drive will be uniform, inasmuch as both wheels are positively engaged upon the axle. In making a turn, the drive is continued with the wheel at the inner side of the turn, which continues the drive at axle rate. In consequence, the wheel on the outer side of the turn is accelerated owing to the longer radius of its travel. Such acceleration releases the clutch for said wheel by the retraction of said male member 8. In other words, the construction is such that the clutch ceases to operate for either wheel when said wheel rotates at a higher rate than the shaft rate and remains effective under all driving conditions. This obviates all "skidding" inasmuch as each wheel drives positively and uniformly at shaft rate, and can only cease to drive independently of the other when accelerated above shaft rate, while skidding is occasioned where differential mechanisms per se are used by one wheel ceasing to drive or the rotation thereof falling below that of the other, which acts as the driving wheel. From the construction described, the rate of drive from either wheel can never fall below shaft rate, and in consequence the car or vehicle is always safely propelled whether one or both driving wheels are on a good driving surface.

In reversing, the operation is exactly as described with reference to the forward drive except that a very slight preliminary rotation of the axle engages the rollers 13, in the cam grooves at the opposite side of the center thereof. The pitch of the cam groove is such as to require but a slight reversal of the shaft to bring the same into reverse position.

Of course, it is immaterial if a cone clutch *per se* be actuated as described, or what the particular type of frictional or other engaging members to afford the clutch, may be. While I have shown a shaft drive in the drawings, it is, of course, to be understood that the invention is as applicable to a chain drive as to a shaft drive. I have shown a cone clutch as but one embodiment of my invention, and I therefore do not purpose limiting the patent, when granted upon this application, otherwise than necessitated by the prior art, as numerous details of the construction may be varied without departing from the principles of this invention.

I claim as my invention:

1. The combination with a rotative shaft of a wheel freely rotatable thereon, a clutch member rigidly secured to the wheel, a complemental clutch member having limited rotation on the shaft, diametrically disposed means projecting therefrom and a cam operated by the shaft and provided with a groove engaged by said means to bring said clutch members into engagement when the shaft is rotated in either direction.

2. The combination with a shaft of a wheel freely rotatable thereon, a clutch member rigidly secured to the wheel, a complemental coacting clutch member having limited rotation on the shaft, radially disposed rollers mounted thereon and a cam rigidly secured to, and operated by, the shaft and grooved to engage said rollers to bring said clutch members into engagement when the shaft is rotated in either direction.

3. The combination with a shaft of a wheel freely rotatable thereon, a female clutch member rigidly secured to the wheel, a complemental male clutch member having limited rotation on the shaft, radially disposed rollers mounted thereon and a cam having an angled peripheral groove and operated by the shaft to actuate said clutch member by means of rollers into engagement with said female screw when the shaft is rotated in either direction.

4. A differential clutch for motor vehicles comprising the driving axle, the driving wheels rotatably secured on each end thereof, a clutch member secured on the inner side of each wheel concentric with the axle, a complemental clutch member secured in operative relation therewith at each end of the axle and having limited movement on the axle, cams rigidly fixed on the axle adjacent each of the last named clutch members and radially projecting means on each of said members engaged by one of said cams to permit the cam to positively actuate the same into engagement with its complemental member when the shaft is rotated in either direction.

5. A differential clutch for motor vehicles comprising the driving axle, the driving wheels rotatably secured on each end thereof, a clutch member secured on the inner side of each wheel concentric with the axle, a complemental clutch member supported in operative relation therewith at each end the axle and adjustable and having limited rotation on the axle, a cam rigidly fixed on the shaft adjacent each of the last named clutch members, and studs projecting from said clutch member into engagement with said cam.

6. A differential clutch for motor vehicles comprising the driving axle, the driving wheels rotatably secured on each end thereof, a female clutch member secured on the inner side of each wheel concentric with the axle, a complemental clutch member secured in operative relation therewith at each end the axle and having limited rotation on the axle, and adjustable longitudinally thereof, a cam rigidly fixed on the axle adjacent each of the last named clutch members, integral projections extending outwardly from said complemental clutch member over said cam, and rollers journaled thereon engaging said cam, permitting said cam to positively actuate the complemental member into engagement with the female member when the shaft is rotated in either direction.

7. A differential clutch of the class described embracing a movable member secured on the axle, a complemental member rigidly secured on the wheel, means for driving the axle, and rollers connecting the axle with its movable clutch members whereby the clutches engage the wheels on the axle when the axle is driven at a higher rate than the wheel and release either or both the wheels from the axle when the axle is driven at a higher rate than the wheel.

8. A differential clutch of the class described embracing a movable cone clutch member secured on the axle, a complemental member rigidly secured on the wheel, means for driving the axle, and a cam and rollers tracking therein affording a connection between the axle with its movable clutch members whereby the clutches engage the wheels on the axle when the axle is driven at a higher rate than the wheel and release the wheels from the axle when the rate of rotation of the wheel is higher than that of the axle.

9. The combination with a wheel and its axle, of a differential clutch therefor comprising a female clutch member secured to the wheel, a peripheral flange thereon affording a brake band, a male clutch member journaled on said axle, a cam member keyed on said axle, inwardly projecting radially directed rollers secured to said male clutch member and said cam member having angled grooves therein adapted to cause longitudinal movement of said male clutch member when said cam member is rotated by said axle to cause engagement of the clutch members to drive the wheel from the axle.

In testimony whereof I have hereunto subscribed my name in the presence of two subscribing witnesses.

BERNHARD SETTERGREN.

Witnesses:
CHARLES W. HILLS, Jr.,
LAWRENCE REIBSTEIN.